Nov. 7, 1939.  C. A. CAMPBELL  2,178,927
AIR BRAKE
Filed July 20, 1937  3 Sheets-Sheet 1
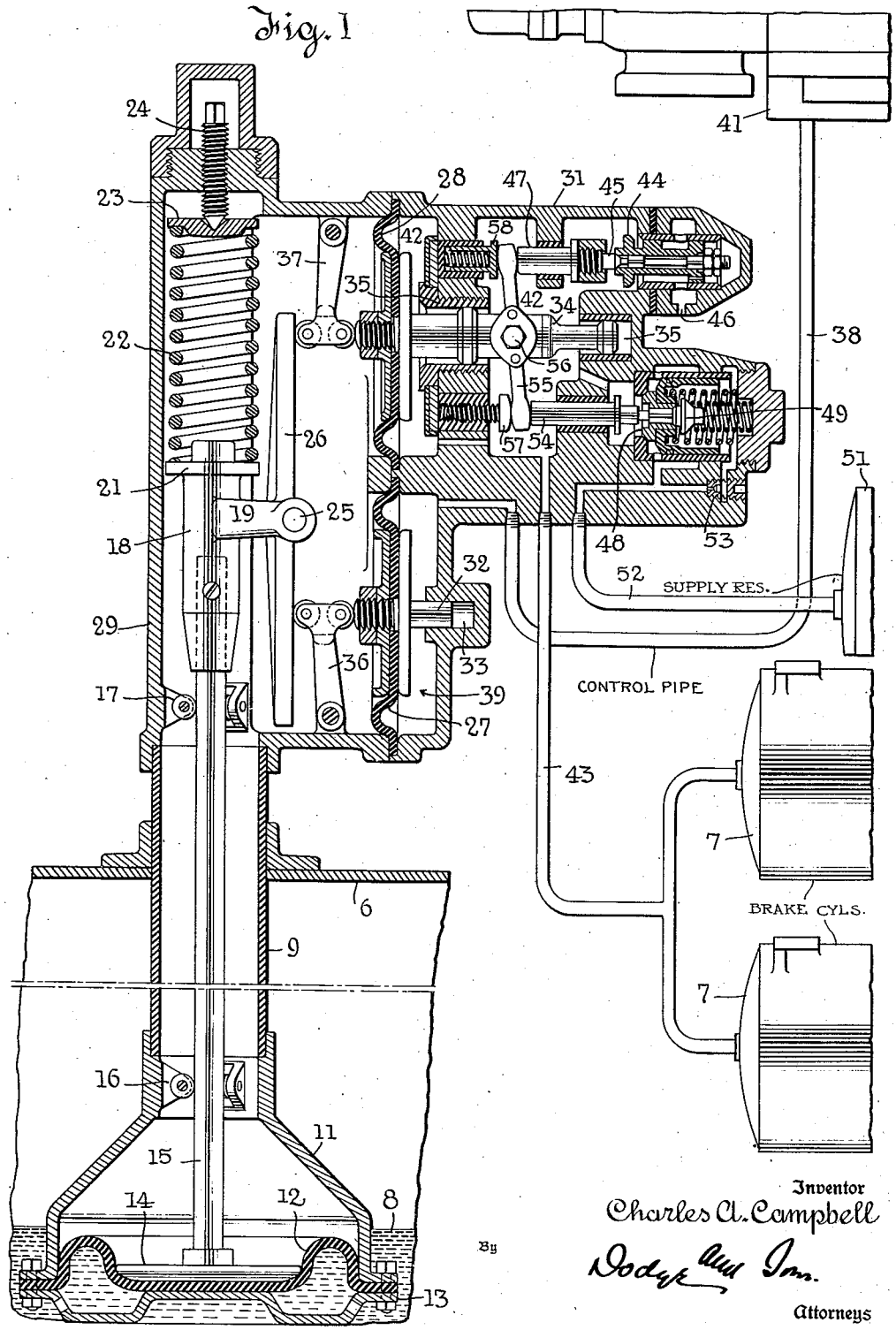
Inventor
Charles A. Campbell
By Dodge and Sons
Attorneys

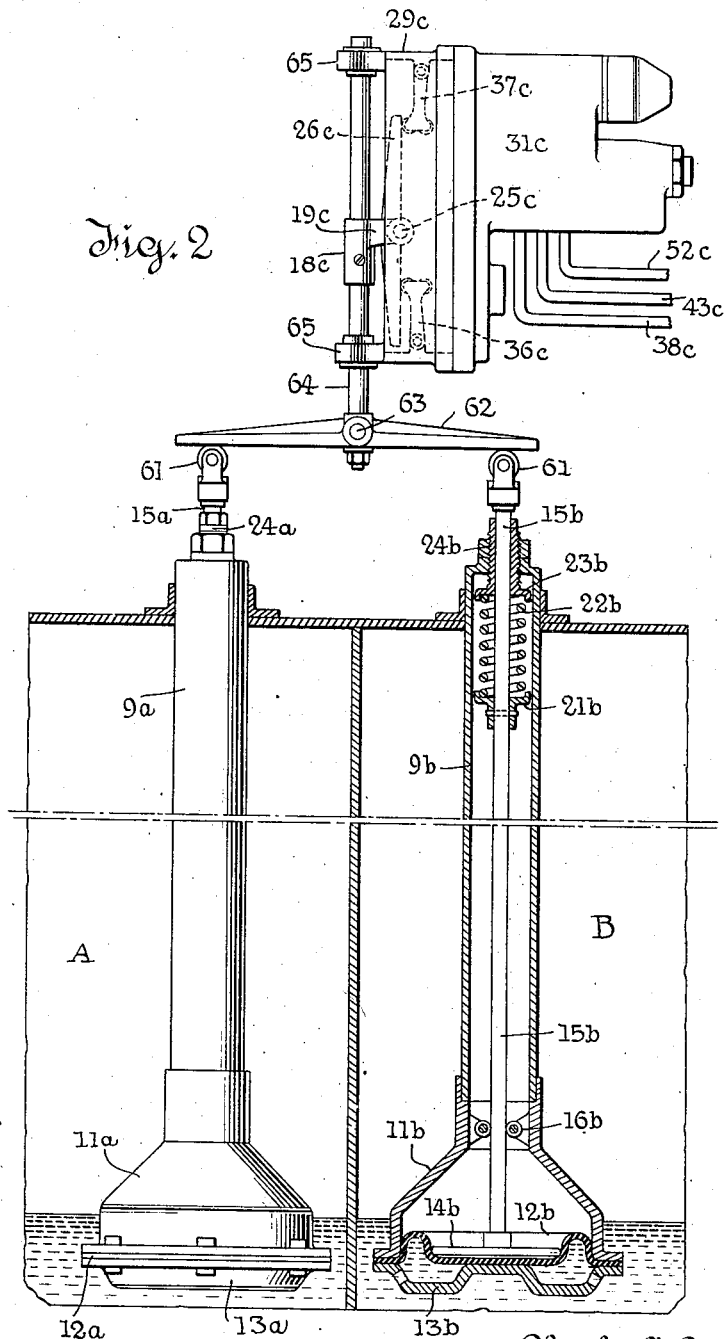

Nov. 7, 1939.   C. A. CAMPBELL   2,178,927
AIR BRAKE
Filed July 20, 1937   3 Sheets-Sheet 3
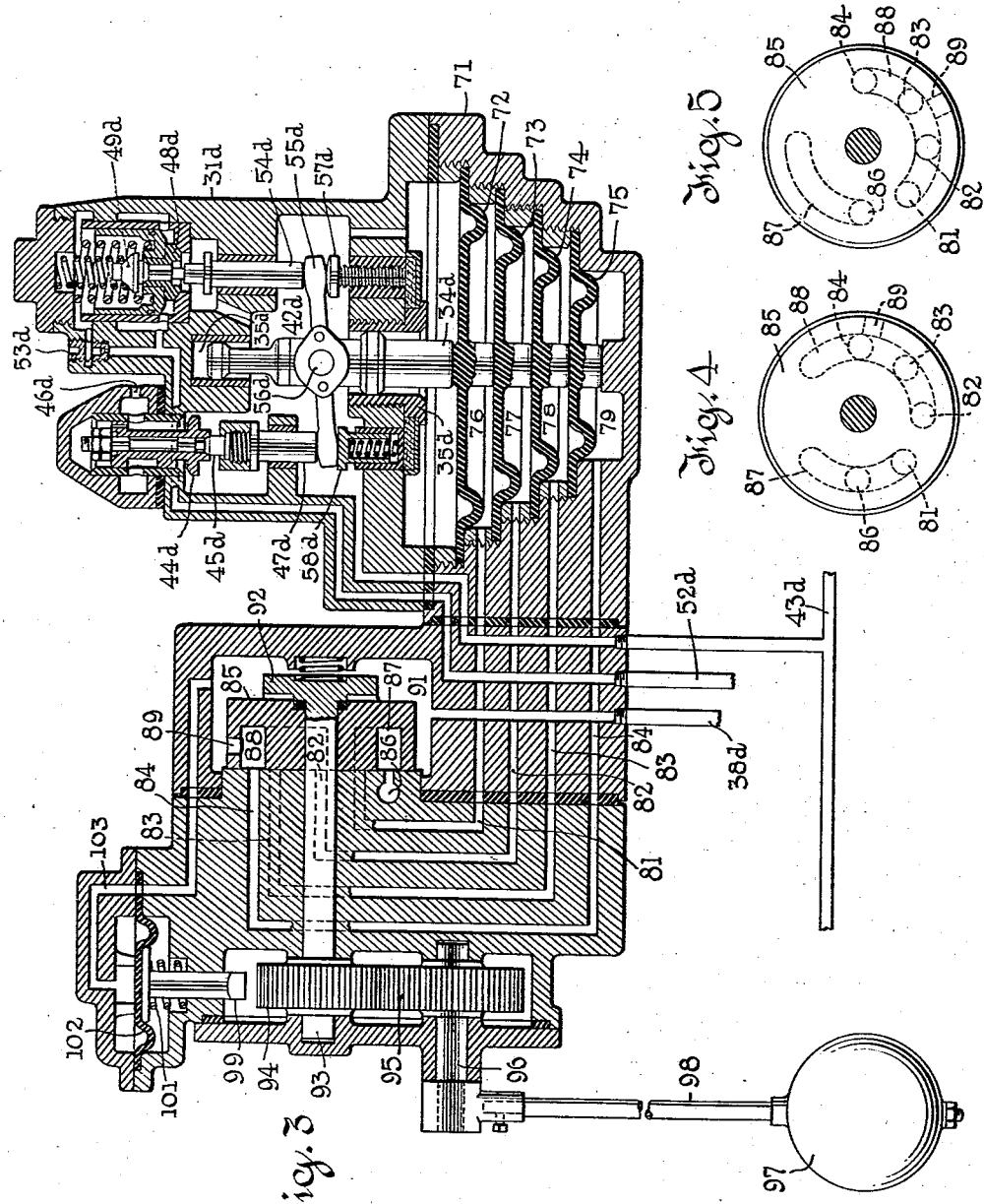
Inventor
Charles A. Campbell
By
Attorneys Patented Nov. 7, 1939

2,178,927

UNITED STATES PATENT OFFICE 2,178,927

AIR BRAKE

Charles A. Campbell, Watertown, N. Y., assignor to The New York Air Brake Company, a corporation of New Jersey Application July 20, 1937, Serial No. 154,675

6 Claims. (Cl. 303—22)

This invention relates to air brakes, and particularly to means for varying the braking ratio in direct relation to the loading of the car.

In the relatively recent past there has been a tendency to control admission and exhaust of air to and from the brake cylinders by a relay valve which laps when the brake cylinder pressure balances the pressure in what might be described as the control pipe. The pressure in this control pipe is established, during braking by any one of several alternative devices which I shall designate generically by the term "brake controlling valve device." Such brake controlling valve device, for example, might be a triple valve, such as the well known AB triple valve. It might be the distributing valve forming part of the well known LT equipment. It might be a control valve such as that used in the HSC equipment or it might be an engineer's brake valve, particularly a straight air brake valve.

So far as the present invention is concerned it is immaterial how the control pipe pressure is established.

The essence of the present invention is the provision of some ratio changing means between the governing force developed by control pipe pressure and the balancing force developed in the relay valve mechanism.

The present invention is particularly adapted to adjusting the braking ratio in response to the load of liquid in a tank car or in the tanks of locomotive tenders or in the fuel tanks of a Diesel operated propelling unit, or in both the fuel and water tanks of the tender of an oil-fired locomotive.

Generally stated, the ratio adjusting means responds to the level of liquid in the tank, or to the average of the independent levels in a plurality of tanks, to change the force relationship between a diaphragm or abutment subject to control pipe pressure and the actuating diaphragm of the relay which is subject to the pressure developed by the relay.

The invention has a wider range of utility than ordinary empty and load brake mechanism, because unlike these mechanisms, the braking ratios are proportioned directly to the load.

Preferred embodiments of the invention will now be described in connection with the accompanying drawings, in which:

Figure 1 is a view, chiefly in vertical section, and somewhat diagrammatic in character, showing a ratio changing mechanism subject to control by the static head of liquid in a tank;

Fig. 2 is a view showing how the same ratio changing mechanism may be made to respond to the average of two independently variable hydrostatic pressures;

Fig. 3 shows a modification, which instead of being progressive in action offers a plurality of stages of adjustment, four being shown. In this view an opportunity is taken to show how the mechanism may be controlled by a float responsive to liquid level instead of by means responsive to hydrostatic pressure, as in Figs. 1 and 2;

Fig. 4 is a plan of the rotary valve on its seat, showing ⅔ load position; and

Fig. 5 is a similar view showing full load position.

Referring first to Fig. 1, a portion of the tank structure of a car or tender is indicated at 6, while 7 represents the brake cylinders for such car or tender. The tank may assume various forms and the brake cylinders may vary in size and number according to requirements. The tank contains liquid to some level indicated at 8 and understood to be variable.

Mounted in the tank 6 is a dip pipe 9 terminating in a bell 11 closed at its lower end by a flexible diaphragm 12. This diaphragm is clamped at its margin by the ported cap-plate 13 so that the diaphragm is subject on its lower face to the static head of liquid in tank 6, close to the bottom of the tank.

The upward thrust of the liquid is delivered to head 14 on the rod 15 which is vertically guided by the roller guides 16, 17, and carries at its upper end a head 18 with lateral bracket 19 and spring seat 21. A coil compression spring 22 is confined between seat 21 and an opposed seat 23 which is adjustable by turning thrust screw 24. Thus, the spring stress may be adjusted.

Bracket 19 carries a fulcrum pin 25, on which is hinged a force ratio changing lever 26 whose outer face is a plane passing through the geometrical axis of pin 25. In the normal, or release position of the relay hereinafter described, the plane front face of lever 26 is parallel with the axis and path of movement of rod 15.

Lever 26 acts as motion transmitting means between two diaphragms 27 and 28 preferably but not necessarily of equal areas and forming part of the relay. Vertical displacement of fulcrum 25 changes the force ratio, and inversely thereto, the motion ratio of the two diaphragms. Diaphragm 27 is the loading diaphragm subject to control pipe pressure and diaphragm 28 is the lapping diaphragm which develops an opposing force corresponding to the braking pressure developed in the brake cylinders.

The two diaphragms are clamped at their margins between a housing 29 carried by dip pipe 9 and the body 31 of the relay. Diaphragm 27 is guided at its center by stem 32 which works in a guideway 33 in body 31 and is clamped through the center of the diaphragm with the usual thrust discs. The center of diaphragm 28 is guided by stem 34 guided at 35 in body 31 and also clamped through the center of diaphragm 28 with thrust discs. The construction is clearly illustrated and the details of connection are conventional.

To transmit motion between the diaphragms 27 and 28 and lever 26, two swinging arms 36 and 37 are used, each arm having two thrust rollers, as shown, to reduce friction.

The space to the left of both diaphragms is at atmospheric pressure. The control pipe 38 leads to chamber 39 to the right of diaphragm 27. Thus, when the brake controlling valve device 41 is operated to produce a brake application, a definite pressure will be established in chamber 39, forcing the diaphragm to the left, with a force dependent on the degree of action of the device 41.

The space 42 to the right of diaphragm 28, within housing 31, is connected by pipe 43 with the brake cylinders 7, and stem 34 is the actuating means of a relay valve mechanism which alternatively admits and exhausts air to and from the brake cylinders 7.

Since this relay valve mechanism, so far as the valve components are concerned, is conventional and subject to variation, a brief description will suffice.

The main exhaust valve 44 and the exhaust pilot valve 45 control exhaust from chamber 42, and hence from the brake cylinders, through atmospheric port 46. A sliding stem 47 is the valve actuating member.

The main inlet valve 48 and inlet pilot valve 49 control flow from reservoir 51 (or other source of compressed air) via pipe 52 to chamber 42 and hence to the brake cylinders. A choke 53 is interposed between pipe 52 and the inlet pilot valve as usual. A sliding stem 54 is the valve actuating member.

Rod 34 carries the double ended lever 55 which is pivoted at 56 to rod 34. The lower end is confined between an adjustable stop 57 and the end of stem 54, while the upper end is confined between a spring stop 58 and stem 47.

The parts are shown in release position, exhaust valve 44 being open and inlet valves 48, 49 closed. If pressure be developed in chamber 39 by operation of brake controlling valve device 41, diaphragm 27 is forced to the left, turning lever 26 clockwise and forcing diaphragm 28 to the right. The first effect is to close exhaust valves 44, 45, valves 48, 49 remaining closed. However, as soon as valves 44, 45 seat they arrest motion of the upper end of lever 55, whereupon continued motion of diaphragm 28 and stem 34 will unseat pilot valve 49 and then main valve 48. This admits reservoir air to chamber 42 and brake cylinders 7, developing pressure therein until diaphragm 28 is forced back far enough to permit valves 48, 49 to close. This is lap position.

Lap position is reached by the attainment of force balance between diaphragms 27 and 28. The deeper the liquid in tank 6 the greater the load on the car, and also the higher the position of fulcrum 25. Thus the force relation between diaphragms 27 and 28 varies with the lading of the car, the effect being to increase the braking ratio in direct proportion to the load.

Fig. 1 is designed to show how a relay may be adjusted according to load, and all accessory apparatus is shown in the simplest form. This control mechanism can be incorporated in a wide range of braking systems to vary the braking ratio in proportion to load, and Fig. 1 should be interpreted as illustrative and not limiting.

Some cars have two or more tanks in which liquid levels vary independently. For example the tender of an oil burning locomotive has a water tank and a fuel oil tank. In such case the arrangement of Fig. 2 may be used.

In this figure tank A and tank B have each a dip pipe 9a or 9b as the case may be and parts corresponding to 11—16 and 21—24 of Fig. 1. These parts, so far as visible, are similarly marked but distinguished by the letters a and b.

The rods 15a, 15b carry at their upper ends rollers 61 which react against an equi-armed combining lever 62 pivoted at 63 to the slide rod 64 which is guided to move vertically in the guides 65. Obviously rod 64 assumes positions corresponding to the mean of the liquid levels in the two tanks A and B. Rod 64 carries a head 18c similar to the head 18 of Fig. 1. This has bracket 19c, fulcrum 25c and lever 26c, corresponding to similarly numbered parts in Fig. 1. All parts of the relay are identical with the structure shown in Fig. 1 and bear corresponding reference numerals with the letter c.

The structure of Fig. 2 operates exactly as does the structure of Fig. 1 except that adjustment conforms to the mean of liquid levels in two tanks instead of to the liquid level in one tank.

In Fig. 2 lever 62 is shown as equi-armed because tanks A and B are assumed to be of equal area in plan, but if one tank has a larger plan area than the other, the arms of lever 62 should be unequal and inversely proportional to the plan areas of the two related tanks. Thus the tank of larger area in which a given increase in liquid depth will produce a larger increase in lading, exerts a larger effect on the position of rod 65. Consequently the braking ratio will be properly proportioned to lading. Of course with horizontal cylindrical tanks, lading is not directly proportional to depth, but even here the approximation is close enough for practical purposes.

In Fig. 3 a modified arrangement is shown. Instead of changing the lever ratio between two diaphragms such as 27 and 28, a series of interchangeable diaphragms of different area are used selectively to perform the function of diaphragm 27, thus giving several graduated force ratios.

In this figure 31d is the body or housing of the relay whose chamber 42d is connected by pipe 43d with the brake cylinders (not shown). The inlet valve is connected by pipe 52d with the supply reservoir (not shown). All parts in body 31d are identical in form and function with parts in body 31 of Fig. 1 and are similarly numbered with the letter d.

Body 31d is bolted to a body 71 in which are edge clamped four parallel diaphragms 72, 73, 74, 75, each having a boss or hub at its center as shown, in contact with the hub of the next lower and smaller diaphragm. The upper and largest diaphragm is subject on its upper face to air pressure in chamber 42d of the relay and engages the lower end of stem 34d of the relay. The hub of the lowest and smallest diaphragm 75 engages a stop or boss in housing 71 which limits the downward motion of all four diaphragms.

The spaces 76, 77, 78, 79 are connected to ports 81, 82, 83 and 84 in the seat of rotary valve 85. There is also an exhaust port 86 in said seat. In the face of the rotary valves are two arcuate ports of which the first 87 serves to connect the exhaust port 86 with one or more of the ports 81, 82, 83 in the order stated as the valve turns counterclockwise on its seat. The other arcuate port 88 is connected by port 89 with the space 91 to which control pipe 38d leads. The two ports are so arranged that port 84 is always connected with the control pipe, and ports 83, 82 and 81 are connected to the control pipe except when they are connected to exhaust port 86.

The valve is turned by key 92 on stem 93 which carries gear 94. A second gear 95 on shaft 96 meshes with gear 94 and a float 97 carried by arm 98 fast on shaft 96 responds to the changing liquid level in the tank, this being an alternative way of producing motion by change of liquid level.

The parts are so arranged that when the tank is full all the spaces 76, 77, 78, 79 (ports 81, 82, 83, 84) are connected to the control line. Hence diaphragms 73, 74 and 75 are each in balance and inert, and the relay responds to pressures acting on the opposite sides of diaphragm 72.

At a lower liquid level space 76 (port 81) is connected to atmosphere, diaphragms 74 and 75 are in balance and the relay responds to the differential on diaphragms 72 and 73.

At a still lower level spaces 76 and 77 (ports 81 and 82) are connected to atmosphere, diaphragms 73 and 75 are in balance and the relay responds to the differential on diaphragms 72 and 74.

At the lowest level spaces 76, 77 and 78 (ports 81, 82 and 83) are connected to atmosphere, diaphragms 73 and 74 are in balance and the relay responds to the pressure differential on diaphragms 72 and 75.

To hold the valve 85 in adjusted positions during brake applications, a detent 99 is provided. This may engage between teeth on gear 94, but is urged to disengaged position by a spring 101. A diaphragm 102 subject to control pipe pressure communicates through port 103 and engages the detent whenever a brake applying pressure is developed in the control pipe.

The structure of Figs. 3-5 changes the force ratio by changing the effective diaphragm area rather than a lever connection, but except that the adjustment is stepped instead of strictly progressive, the operation is similar to that of the structure shown in Fig. 1.

Several modifications have been described and others are possible. The embodiments described are illustrative and not limiting, and the scope of the invention is defined solely by the claims.

What is claimed is:

1. In a brake for cars of the type in which a substantial part of the lading is a liquid carried in a tank, the combination of a brake controlling valve device; a relay responsive to pressure established by said valve device and serving to establish a related brake applying pressure; adjustable means associated with the relay for establishing different ratios between the pressure created by the brake controlling valve device and the related brake applying pressure established by the relay, the adjustment of said means being progressive at least to the extent that there are more than two settings which differ by successive small increments; and means responsive to the depth of the liquid in such tank determining the adjustment of said adjustable means.

2. In a brake for cars in which a substantial part of the lading comprises a liquid carried in a tank, the combination of a brake controlling valve device; a relay including two actuating abutments and inlet and exhaust valve mechanism controlled thereby and serving to control a brake applying pressure, said abutments acting in opposition to each other and one being subject to pressure created by the brake controlling valve device and the other to said brake applying pressure; means for gradually modifying the force ratio between said abutments; and means responsive to the depth of liquid in said tank for adjusting said modifying means.

3. In a vehicle brake, the combination of a brake controlling valve device; a relay including two opposed pressure actuated abutment mechanisms and inlet and exhaust valve mechanism conjointly controlled by said abutment mechanisms and serving to control a brake applying pressure, one of said abutment mechanisms being subject to pressure created by the brake controlling valve device, and the other being subject to brake applying pressure, one of said abutment mechanisms including means to change the effective area thereof subject to the pressure reacting thereupon, whereby the force ratio of the two abutment mechanisms may be varied; and means responsive to the vehicle lading and serving to operate said area varying means.

4. In a vehicle brake, the combination of a brake controlling valve device; a relay responsive to pressure established by said device and serving to establish a related brake applying pressure; means associated with the relay for maintaining different ratios between the pressure created by the brake controlling valve device and the brake applying pressure established by the relay; and means responsive to the average of at least two liquid levels for actuating the last named means.

5. In a vehicle brake, the combination of a brake controlling valve device adapted to establish pressure for brake controlling purposes; a brake cylinder; a source of pressure fluid; a relay comprising two opposing abutment means, one subject to the braking pressure which causes energization of the brake cylinder and the other subject to pressure established by said brake controlling valve device, and inlet and exhaust valve means serving to admit pressure fluid from said source to said brake cylinder and to exhaust said brake cylinder, said valve means being operated by the differential of forces developed by the pressures acting on said abutments to regulate said braking pressure; and means responsive solely to vehicle lading to adjust the force relation between said two abutment means, such adjustment being progressive, at least to the extent that there are more than two effective settings between which the force relations differ by small successive increments.

6. In a vehicle brake, the combination of a brake controlling valve device adapted to establish pressure for brake controlling purposes; a brake cylinder; a source of pressure fluid; a relay comprising two opposing abutment means, one subject to the braking pressure which causes energization of the brake cylinder and the other subject to pressure established by said brake controlling valve device, and inlet and exhaust valve means serving to admit pressure fluid from said source to said brake cylinder and to exhaust said brake cylinder, said valve means being operated by the differential of forces developed by the pressures acting on said abutments to regulate said braking pressure; means responsive to vehicle lading to adjust the force relation between said two abutment means, such adjustment being progressive, at least to the extent that there are more than two effective settings between which the force relations differ by small successive increments; and means rendered active by the establishment of pressure by said brake controlling valve device to inhibit change of said adjustment while said pressure is maintained.

CHARLES A. CAMPBELL.